US011691532B2

(12) United States Patent
Liu et al.

(10) Patent No.: US 11,691,532 B2
(45) Date of Patent: Jul. 4, 2023

(54) ON-BOARD INTEGRATED CHARGING DEVICE AND CURRENT DISTRIBUTION CALCULATING METHOD THEREOF

(71) Applicant: Shenzhen Vmax New Energy Co., Ltd., Guangdong (CN)

(72) Inventors: Jun Liu, Guangdong (CN); Yingying Feng, Guangdong (CN); Shun Yao, Guangdong (CN); Biwei Zheng, Guangdong (CN)

(73) Assignee: SHENZHEN VMAX NEW ENERGY CO., LTD., Guangdong (CN)

( * ) Notice: Subject to any disclaimer, the term of this patent is extended or adjusted under 35 U.S.C. 154(b) by 164 days.

(21) Appl. No.: 17/321,817

(22) Filed: May 17, 2021

(65) Prior Publication Data

US 2021/0268928 A1    Sep. 2, 2021

Related U.S. Application Data

(63) Continuation of application No. PCT/CN2020/101119, filed on Jul. 9, 2020.

(30) Foreign Application Priority Data

Aug. 15, 2019   (CN) .......................... 201910754767.6

(51) Int. Cl.
*B60L 53/62*     (2019.01)
*B60L 58/20*     (2019.01)
(52) U.S. Cl.
CPC .............. *B60L 53/62* (2019.02); *B60L 58/20* (2019.02); *B60L 2210/30* (2013.01)
(58) Field of Classification Search
CPC ...... B60L 53/62; B60L 58/20; B60L 2210/30; B60L 53/22; B60L 2210/10;
(Continued)

(56) References Cited

U.S. PATENT DOCUMENTS

2016/0016479 A1*  1/2016  Khaligh ................. H01F 38/08
                                                          336/170
2021/0155100 A1*  5/2021  Khaligh .............. H02M 1/4208

FOREIGN PATENT DOCUMENTS

CN      106936184 A    7/2017
CN      107623365 A    1/2018
(Continued)

OTHER PUBLICATIONS

International Search Report of PCT/CN2020/101120, dated Jul. 9, 2020.

*Primary Examiner* — Paul Dinh
(74) *Attorney, Agent, or Firm* — Locke Lord LLP; Tim Tingkang Xia, Esq.

(57) ABSTRACT

The present invention discloses an on-board integrated charging device and a current distribution calculating method thereof. The on-board integrated charging device comprises a voltage conversion module. The voltage conversion module is provided with an AC terminal connected to an alternating current or an alternating current load, an HV terminal connected to a power battery and an LV terminal connected to a direct current load. When the AC terminal is idle, the LV terminal is powered by the HV terminal, and an input current of the LV terminal is an actual current of the HV terminal. According to the on-board integrated charging device, OBC, DCAC and DCDC functions can be integrated on the same circuit board, a current reporting requirement can be realized through a distribution algorithm, and the volume and weight of the whole device can be reduced.

11 Claims, 3 Drawing Sheets

(58) Field of Classification Search
CPC .. B60L 2210/40; Y02T 10/70; Y02T 10/7072;
Y02T 10/72; Y02T 10/92; Y02T 90/12;
Y02T 90/14; H02J 7/04
USPC ........................................................ 320/107
See application file for complete search history.

(56) References Cited

FOREIGN PATENT DOCUMENTS

| CN | 107662498 A | 2/2018 |
| CN | 110474410 A | 11/2019 |

\* cited by examiner

ON-BOARD INTEGRATED CHARGING DEVICE AND CURRENT DISTRIBUTION CALCULATING METHOD THEREOF

CROSS-REFERENCE TO RELATED PATENT APPLICATION

This application is a continuation application of International Patent Application No. PCT/CN2020/101120, filed on Jul. 9, 2020, which itself claims priority to Chinese Patent Application No. CN201910754767.6 filed in China on Aug. 15, 2019. The disclosures of the above applications are incorporated herein in their entireties by reference.

TECHNICAL FIELD

The present invention relates to the technical field of on-board charging devices, in particular to an on-board integrated charging device and a current distribution calculating method thereof.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

With the dual pressures of energy sources and environmental protection, new energy electric vehicles have become an emerging power in the automotive industry. Advocating green travel and changing the travel structure have become mainstream. Electric vehicles account for an increasing proportion in the entire automotive industry, including hybrid electric vehicles (HEV), plug-in hybrid electric vehicles (PHEV) and purely electric vehicles (EV). HEV does not require external charging equipment, but provides less new energy, while PHEV and EV require external charging equipment.

In addition, many emerging automobile enterprises have proposed a two-way OBC requirement, that is, adding an inversion function to traditional OBC. With this function, the energy of a power battery of an electric vehicle can be charged to other electric vehicles through a discharge gun, or a direct current of the power battery can be inverted into an alternating current in the vehicle so as to supply power to AC equipment in the vehicle.

At present, charging devices in new energy vehicles mainly exist in two modes. In the first mode, the device includes three completely separate parts, which are separate OBC parts, separate DC/AC parts and separate DC/DC parts. In the second mode, OBC and DC/AC are integrated in one part, and DC/DC is a separate part. The second mode of these two modes is mostly used on the market, but in general, parts of these two modes are separate over the whole vehicle and, both in terms of weight and volume, occupy a large amount of space in the vehicle, which is not conducive to the lightweight of new energy vehicles and the maximization of vehicle space.

Therefore, how to design a multifunctional on-board integrated charging device and a current distribution calculating method thereof is a technical problem to be solved urgently in the industry.

SUMMARY

In order to overcome the defects of large volume and space occupation of existing charging devices, the present invention proposes an on-board integrated charging device and current distribution calculating method thereof.

The technical scheme adopted by the present invention is to design an on-board integrated charging device. The vehicle integrated charging device comprises a voltage conversion module, wherein the voltage conversion module is provided with an AC terminal connected to an alternating current or an alternating current load, an HV terminal connected to a power battery, and an LV terminal connected to a direct current load; when the AC terminal is idle, the LV terminal is powered by the HV terminal; when the AC terminal is connected to the alternating current, the LV terminal and the HV terminal are both powered by the AC terminal; and when the AC terminal is connected to the alternating current load, the AC terminal and the LV terminal are both powered by the HV terminal.

Preferably, the voltage conversion module comprises a transformer, wherein a primary winding is arranged on one side of the transformer, and two secondary windings which are connected in parallel are arranged on the other side of the transformer; the primary winding is connected to the AC terminal through a primary full-bridge rectifier circuit; one of the secondary windings is connected to the HV terminal through a secondary full-bridge rectifier circuit; and the other of the secondary windings is connected to the LV terminal through a secondary half-bridge rectifier circuit.

Preferably, a series resonance circuit is also arranged between the primary full-bridge rectifier circuit and the primary winding.

The present invention further provides a current distribution calculating method for the on-board integrated charging device. The current distribution calculating method comprises the following steps: taking an input current of the LV terminal as an actual current of the HV terminal when the LV terminal is only powered by the HV terminal;

acquiring a theoretical current $I_{hv}$ of the current HV terminal through a preset first calculation method when the HV terminal and the LV terminal are both powered by the AC terminal, wherein the input current of the LV terminal is acquired from the theoretical current $I_{hv}$ of the current HV terminal minus the actual current $I_{hv1}$ of the current HV terminal; and acquiring a theoretical current $I_{hv}$ of the current HV terminal through a preset second calculation method when the AC terminal and the LV terminal are both powered by the HV terminal, wherein the input current of the LV terminal is acquired from the actual current $I_{hv1}$ of the current HV terminal minus the theoretical current $I_{hv}$ of the current HV terminal.

Preferably, the first calculation method includes: selecting a corresponding efficiency $\eta_1$ from a preset first efficiency comparison table according to the power of the current HV terminal and the power of the LV terminal, and selecting corresponding adjustment coefficients $k_1$ and $b_1$ from a preset first adjustment coefficient comparison table according to a model of the current on-board integrated charging device; calculating input power $P_{ac}$ of the current AC terminal according to an actual voltage and an actual current of the current AC terminal; calculating theoretical output power $P_{hv}$ of the current HV terminal, $P_{hv}=P_{ac}\div(k_1\times\eta_1+b_1)$; and calculating the theoretical current $I_{hv}$ of the current HV terminal according to $P_{hv}$, and the actual voltage of the current HV terminal.

Preferably, the first efficiency comparison table has a first standard two-dimensional array; two dimensions of the first standard two-dimensional array are segment power of the HV terminal and segment power of the LV terminal, respectively; and each array element in the first standard two-dimensional array has a corresponding efficiency $\eta_1$; and the first adjustment coefficient comparison table has a plurality of different on-board integrated charging device models, wherein each on-board integrated charging device mode has corresponding adjustment coefficients $k_1$ and $b_1$.

Preferably, when the HV terminal and the LV terminal are powered by the AC terminal, a maximum value of the sum of the output power of the HV terminal and the output power of the LV terminal is rated total power P1; the first standard two-dimensional array is acquired in segments according to the rated total power P1, and the efficiency $\eta_1$ corresponding to each array element in the first standard two-dimensional array is collected; and several array elements in the first standard two-dimensional array are selected as first calibration array elements, an actual efficiency $\eta_x$ of an on-board integrated charging device to be tested under different first calibration array elements is collected, and adjustment coefficients $k_1$ and $b_1$ of the model of the on-board integrated charging device are calculated according to the actual efficiency $\eta_x$ and the corresponding $\eta_1$ of the first calibration array element, so that $\eta_x = k_1 \times \eta_1 + b_1$.

Preferably, the second calculation method includes: selecting a corresponding efficiency $\eta_2$ from a preset second efficiency comparison table according to the power of the current AC terminal and the power of the LV terminal, and selecting corresponding adjustment coefficients $k_2$ and $b_2$ from a preset second adjustment coefficient comparison table according to a model of the current on-board integrated charging device; calculating input power $P_{ac}$ of the current AC terminal according to an actual voltage and an actual current of the current AC terminal; calculating theoretical output power $P_{hv}$ of the current HV terminal, $P_{hv} = P_{ac} \div (k_2 \times \eta_2 + b_2)$; and calculating the theoretical current $I_{hv}$ of the current HV terminal according to $P_{hv}$ and the actual voltage of the current HV terminal.

Preferably, the second efficiency comparison table has a second standard two-dimensional array; two dimensions of the second standard two-dimensional array are segment power of the AC terminal and segment power of the LV terminal, respectively; and each array element in the second standard two-dimensional array has a corresponding efficiency $\eta_2$; and the second adjustment coefficient comparison table has a plurality of different on-board integrated charging device models, wherein each on-board integrated charging device mode has corresponding adjustment coefficients $k_2$ and $b_2$.

Preferably, when the AC terminal and the LV terminal are powered by the HV terminal, a maximum value of the sum of the output power of the AC terminal and the output power of the LV terminal is rated total power P2; the second standard two-dimensional array is acquired in segments according to the rated total power P2, and the efficiency $\eta_2$ corresponding to each array element in the second standard two-dimensional array is collected; and several array elements in the second standard two-dimensional array are selected as first calibration array elements, an actual efficiency $\eta_y$ of an on-board integrated charging device to be tested under different first calibration array elements is collected, and adjustment coefficients $k_2$ and $b_2$ of the model of the on-board integrated charging device are calculated according to the actual efficiency $\eta_y$ and $\eta_2$ of the corresponding second calibration array element, so that $\eta_y = k_2 \times \eta_2 + b_2$.

Compared with the related art, the on-board integrated charging device of the present invention integrates the functions of OBC, DCAC, and DCDC on the same circuit board, such that the OBC, DCAC, and DCDC share a set of control circuits, which can calculate the current distribution of a coupling common terminal of the functionally integrated device in real time without adding any special detection circuit; and the current reporting requirements of the separate OBC, DCAC and DCDC can be achieved by optimizing a software algorithm, thereby reducing the volume and weight of the entire device.

BRIEF DESCRIPTION OF THE DRAWINGS

The present invention will be described in detail below in conjunction with embodiments and accompanying drawings, in which.

DETAILED DESCRIPTION

Figure 1:
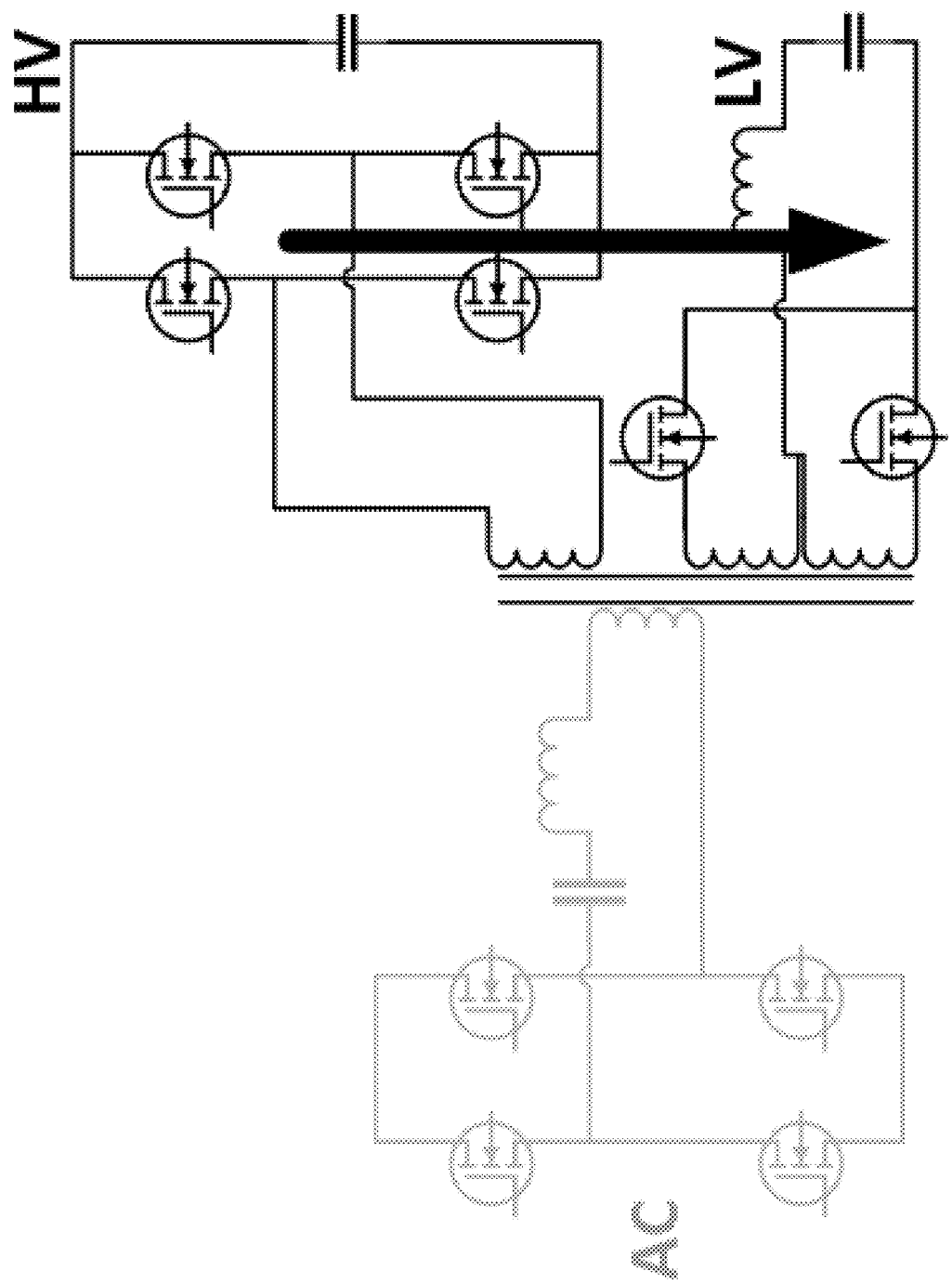
FIG. 1 is a schematic diagram of power supply during the driving of the whole vehicle in the present invention.
Figure 2:
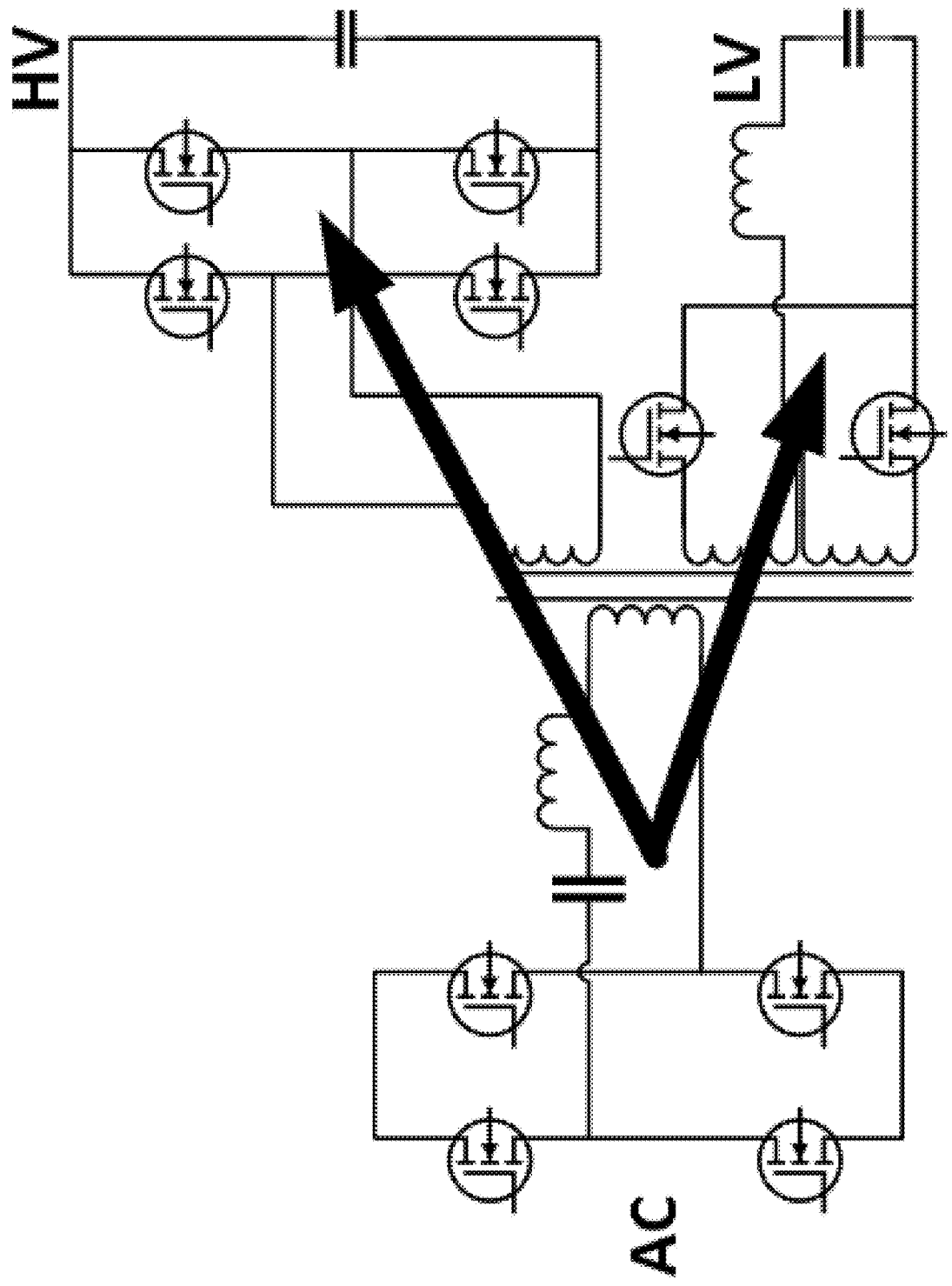
FIG. 2 is a schematic diagram of power supply during the charging of the whole vehicle in the present invention.
Figure 3:
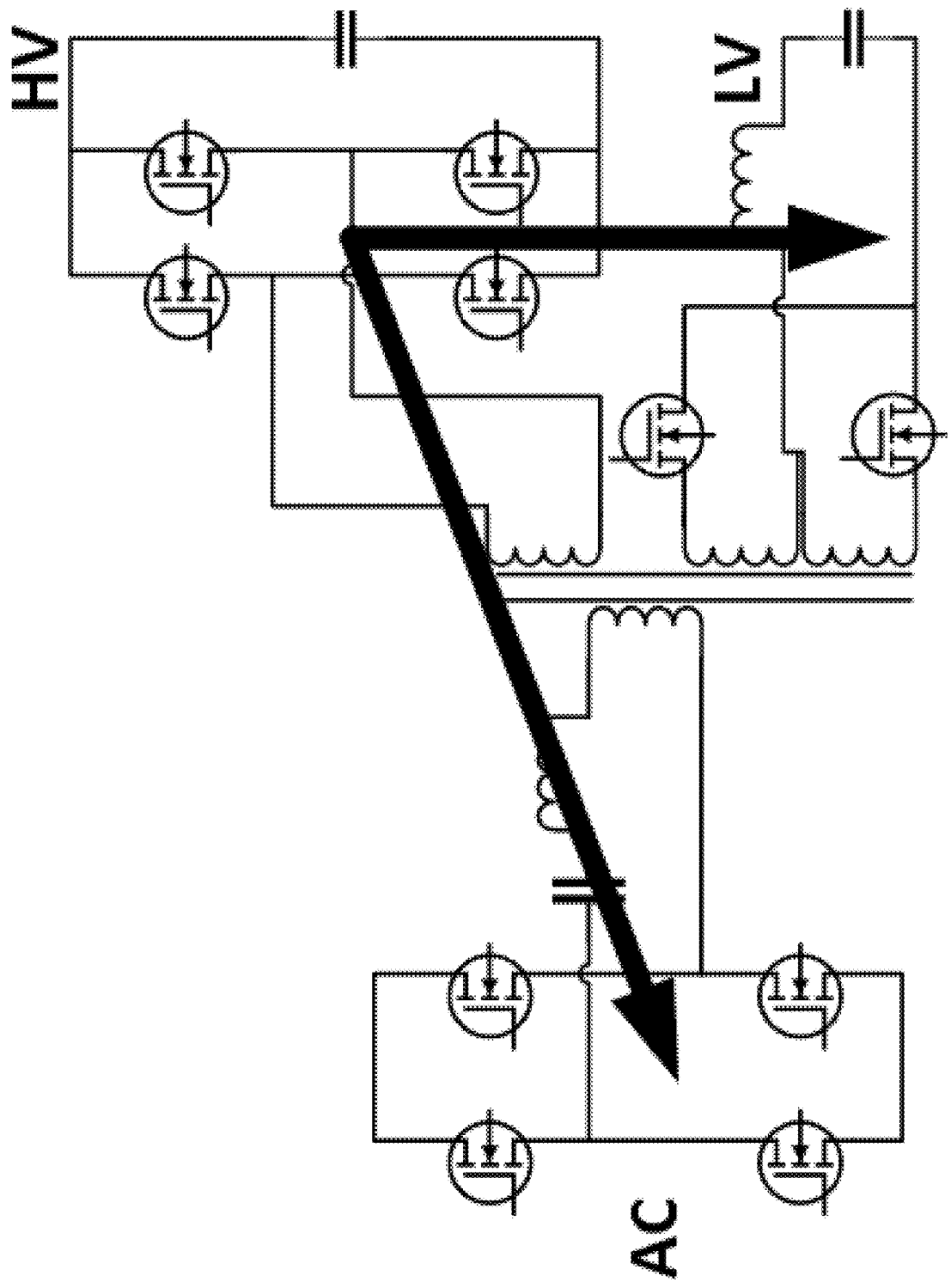
FIG. 3 is a schematic diagram of power supply during inversion discharge of the whole vehicle in the present invention.

As shown in FIG. 1 to FIG. 3, an on-board integrated charging device proposed by the present invention is suitable for new energy electric vehicles. The on-board integrated charging device has three functions of OBC, DCAC and DCDC, and comprises a voltage conversion module, wherein the voltage conversion module is provided with an AC terminal connected to an alternating current or an alternating current load, an HV terminal connected to a power battery, and an LV terminal connected to a direct current load. The voltage conversion module is arranged on a circuit board, and a plurality of detection circuits is coupled and commonly used together to reduce the volume and weight of the entire device. The voltage conversion module comprises a transformer, wherein a primary winding is arranged on one side of the transformer, and connected to the AC terminal through a primary full-bridge rectifier circuit; a series resonance circuit is also arranged between the primary full-bridge rectifier circuit and the primary winding, wherein the series resonance circuit is composed of a capacitor and an inductor which are connected in series; secondary windings which are connected in parallel are arranged on the other side of the transformer, wherein one of the secondary windings is connected to the HV terminal through a secondary full-bridge rectifier circuit, and the other of the secondary windings is connected to the LV terminal through a secondary half-bridge rectifier circuit.

FIG. 1 is an operating mode of the whole vehicle during driving. In this case, the on-board integrated charging device has only DCDC operating mode, the AC terminal is idle, and the LV terminal is powered by the HV terminal. The actual current of the HV terminal is an input current under the current DCDC state, where the actual current is an actual output current of the HV terminal, and this value is directly reported to the whole vehicle as the input current of DCDC.

FIG. 2 is an operating mode of the whole vehicle during charging. In this case, the on-board integrated charging device operates in an OBC+DCDC operating mode, wherein the AC terminal is connected to an alternating current, the LV terminal and the HV terminal are both powered by the AC terminal, and the energy of OBC flows from the AC terminal to the HV terminal. In view of the current state of DCDC, compared to the fact that the energy flows from the HV terminal to the LV terminal under the traditional DCDC operating mode, the DCDC energy of the device flows from the AC terminal to the LV terminal, rather than from the HV terminal to the LV terminal, and therefore, the input current of the LV terminal comes from the AC terminal. For whole vehicle applications, it is required to uniformly report the current output from the HV terminal similar to the traditional DCDC mode. That is, it is necessary to use the current distribution calculating method described below to convert the input current of the LV terminal from the AC terminal to the HV terminal and report it to the whole vehicle.

FIG. 3 is an operating mode of the whole vehicle during inversion discharge. In this case, the on-board integrated charging device operates in a DCAC+DCDC operating mode, the AC terminal is connected to an alternating current load, the AC terminal and the LV terminal are both powered by the HV terminal, and the energy of DCAC flows from the HV terminal to the AC terminal. In view of the current state of DCDC, energy flows from the HV terminal to the LV terminal, which is the same as traditional DCDC. However, since the input of the AC terminal and the input of the LV terminal are both from the HV terminal, and the current detection circuit of the HV terminal is shared, an input current of the LV terminal cannot be directly acquired. For whole vehicle applications, it is required to uniformly report the current output from the HV terminal similar to the traditional DCDC mode. That is, it is necessary to use the current distribution calculating method described below to separate the actual current of the HV terminal so as to obtain the input current of the LV terminal and report it to the whole vehicle. The actual current here is the actual output current of the HV terminal.

The present invention discloses a current distribution calculating method for an on-board integrated charging device. The current distribution calculating method is described in detail below. As shown in FIG. 1, when the LV terminal is supplied by the HV terminal, the input current of the LV terminal is the actual current of the HV terminal. The HV terminal of the on-board integrated charging device is provided with an HV current detection circuit that detects the actual current of the HV terminal, and a detection value of the HV current detection circuit is reported to the whole vehicle as the input current of DCDC.

As show in FIG. 2, when the HV terminal and the LV terminal are supplied by the AC terminal, the on-board integrated charging device is in an OBC+DCDC operating mode. A theoretical current $I_{hv}$ of the current HV terminal is acquired through a preset first calculation method, and an input current of the LV terminal is acquired from the theoretical current $I_{hv}$ of the current HV terminal minus the actual current $I_{hv1}$ of the current HV terminal.

The specific calculation manners of the first calculation method are as follows:

1. a first efficiency comparison table is preset, wherein the first efficiency comparison table has a first standard two-dimensional array; two dimensions of the first standard two-dimensional array are segment power of the HV terminal and segment power of the LV terminal, respectively; each array element in the first standard two-dimensional array has a corresponding efficiency $\eta_1$, wherein the efficiency $\eta_1$ is a corresponding efficiency $\eta_1$ when an on-board integrated charging device which operates according to different array elements in the first standard two-dimensional array is tested by professional equipment in the OBC+DCDC operating mode; the first standard two-dimensional array is formed in such a manner: when the on-board integrated charging device operates in the OBC+DCDC operating mode, a maximum sum of the output power of the HV terminal and the output power of the LV terminal is rated total power P1, which is generally 6.6 KW; the first standard two-dimensional array of different segment power combinations is counted by performing segmentation according to the sum of the output power of the HV terminal+output power of the LV terminal not exceeding 6.6 KW, and the efficiency $\eta_1$ corresponding to each array element in the first standard two-dimensional array is then tested.

2. A first adjustment coefficient comparison table is preset, wherein the first adjustment coefficient comparison table has a plurality of different on-board integrated charging device models, and each on-board integrated charging device model has corresponding adjustment coefficients $k_1$ and $b_1$; the adjustment coefficients $k_1$ and $b_1$ are calculated in such a manner: several array elements in the first standard two-dimensional array are selected as first calibration array elements, an actual efficiency $\eta_x$ of an on-board integrated charging device to be tested under different first calibration array elements is collected, and adjustment coefficients $k_1$ and $b_1$ of the model of the on-board integrated charging device are calculated according to the actual efficiency $\eta_x$ and the corresponding $\eta_1$ of the first calibration array element, so that $\eta_x = k_1 \times \eta_1 + b_1$.

3. A corresponding efficiency is selected from the preset first efficiency comparison table according to the power of the current HV terminal and the power of the LV terminal, and corresponding adjustment coefficients $k_1$ and $b_1$ are selected from a preset first adjustment coefficient comparison table according to a model of the current on-board integrated charging device.

4. According to the actual voltage and the actual current of the current AC terminal, the AC terminal of the on-board integrated charging device is provided with an AC voltage detection circuit that detects an actual voltage of the AC terminal and an AC current detection circuit that detects an actual current of the AC terminal so as to calculate current input power $P_{ac}$ of the AC terminal.

5. Theoretical output power $P_{hv}$ of the current HV terminal is calculated, $P_{hv} = P_{ac} \div (k_1 \times \eta_1 + b_1)$.

6. The theoretical output power $P_{hv}$ of the current HV terminal is divided by the actual voltage of the current HV terminal; and the HV terminal of the on-board integrated charging device is provided with an HV voltage detection circuit that detects an actual voltage of the HV terminal and an HV current detection circuit that detects an actual current of the HV terminal, so as to calculate a theoretical current $I_{hv}$ of the current HV terminal, $I_{hv} = P_{hv} \div H_{hv}$.

7. An input current $I_{in}$ of the LV terminal is calculated according to the theoretical current $I_{hv}$ of the current HV terminal and the actual current $I_{hv1}$ of the current HV terminal, $I_{in} = I_{hv} - I_{hv1}$.

8. $I_{in}$ is reported as the current DCDC input current to the whole vehicle.

As shown in FIG. 3, when the AC terminal and the LV terminal are powered by the HV terminal, the on-board integrated charging device is in a DCAC+DCDC operating mode. A theoretical current $I_{hv}$ of the current HV terminal is acquired through a preset second calculation method, wherein an input current of the LV terminal is acquired from the actual current $I_{hv1}$ of the current HV terminal minus the actual current $I_{hv}$ of the current HV terminal.

The specific calculation manners of the second calculation method are as follows:

1. a second efficiency comparison table is preset, wherein the second efficiency comparison table has a second standard two-dimensional array; two dimensions of the second standard two-dimensional array are segment power of the AC terminal and segment power of the LV terminal, respectively; each array element in the second standard two-dimensional array has a corresponding efficiency $\eta_2$, wherein the efficiency $\eta_2$ is a corresponding efficiency $\eta_2$ when an on-board integrated charging device which operates according to different array elements in the second standard two-dimensional array is tested by professional equipment in the DCAC+DCDC operating mode; the second standard two-dimensional array is formed in such a manner: when the on-board integrated charging device operates in the DCAC+DCDC operating mode, a maximum sum of the output power of the AC terminal and the output power of the LV terminal is a rated total power P2, which is generally 3.3 KW; the second standard two-dimensional array of different segment power combinations is counted by performing segmentation according to the sum of the output power of the AC terminal+output power of the LV terminal not exceeding 3.3 KW, and the efficiency $\eta_2$ corresponding to each array element in the second standard two-dimensional array is then tested.

2. A second adjustment coefficient comparison table is preset, wherein the second adjustment coefficient comparison table has a plurality of different on-board integrated charging device models, and each on-board integrated charging device model has corresponding adjustment coefficients $k_2$ and $b_2$; the adjustment coefficients $k_2$ and $b_2$ are calculated in such a manner: several array elements in the second standard two-dimensional array are selected as second calibration array elements, an actual efficiency $\eta_y$ of an on-board integrated charging device to be tested under different second calibration array elements is collected, and adjustment coefficients $k_2$ and $b_2$ of the model of the on-board integrated charging device are calculated according to the actual efficiency $\eta_y$ and the corresponding $\eta_y$ of the second calibration array element, so that $\eta_y = k_2 \times \eta_2 + b_2$.

3. A corresponding efficiency $\eta_2$ is selected from the preset second efficiency comparison table according to the power of the current AC terminal and the power of the LV terminal, and corresponding adjustment coefficients $k_2$ and $b_2$ are selected from the preset second adjustment coefficient comparison table according to a model of the current on-board integrated charging device.

4. According to the actual voltage and the actual current of the current AC terminal, the AC terminal of the on-board integrated charging device is provided with an AC voltage detection circuit that detects an actual voltage of the AC terminal and an AC current detection circuit that detects an actual current of the AC terminal, so as to calculate input power $P_{ac}$ of the current AC terminal.

5. Theoretical output power $P_{hv}$ of the current HV terminal is calculated, $P_{hv} = P_{ac} \div (k_2 \times \eta_2 + b_2)$.

6. The theoretical output power $P_{hv}$ of the current HV terminal is divided by the actual voltage of the current HV terminal; and the HV terminal of the on-board integrated charging device is provided with an HV voltage detection circuit that detects an actual voltage of the HV terminal and an HV current detection circuit that detects an actual current of the HV terminal, so as to calculate a theoretical current $I_{hv}$ of the current HV terminal, $I_{hv} = P_{hv} \div H_{hv}$, and this value is reported to the whole vehicle as the DCAC input current.

7. An input current $I_{in}$ of the LV terminal is calculated according to the theoretical current $I_{hv}$ of the current HV terminal and the actual current $I_{hv1}$ of the current HV terminal, $I_{in} = I_{hv} - I_{hv1}$.

8. $I_{in}$ is reported as the current DCDC input current to the whole vehicle.

The above abbreviated characters are explained as follows:

HV: High Voltage, i.e., this port of the device is connected to a high-voltage power battery of the whole vehicle;

LV: Low Voltage, i.e., this port of the device is connected to a small battery of the whole vehicle;

AC: Alternating Current, i.e., this port of the device is used for the AC input of a charging pile during charging, or the AC output during discharging;

OBC: On Board Charger, which realizes power conversion of AC—>HV, converts an alternating current of an external charging pile into high-voltage direct current required by the power battery, which is output for charging the power battery of the while vehicle;

DCAC: Direct Current-Alternating current, i.e., DC-AC converter, which is used to realize HV-AC power conversion, and convert a voltage direct current of the power battery into an alternating current, which is output to supply power to external AC equipment; and DCDC: Direct Current-Direct current, i.e., DC-DC converter, which is used to realize HV-LV power conversion, and convert a high-voltage direct current of the power battery into a low-voltage direct current, which is output for a low-voltage circuit of the whole vehicle.

The on-board integrated charging device of the present invention realizes the current distribution calculation of the on-board integrated charging device without adding any auxiliary detection circuit, and meets the current reporting requirements of a whole vehicle manufacturer for a functionally integrated device.

The foregoing descriptions are merely preferred embodiments of the present disclosure, and are not intended to limit the present invention. Within the spirit and principles of the present disclosure, any modifications, equivalent substitutions, improvements, etc., are within the protection scope of the present invention.

What is claimed is:

1. An on-board integrated charging device, comprising a voltage conversion module, wherein
the voltage conversion module comprises a transformer, a primary winding is arranged on one side of the transformer, and two secondary windings which are connected in parallel are arranged on the other side of the transformer;
the voltage conversion module is provided with an Alternating Current (AC) terminal connected to an alternating current or an alternating current load, a High Voltage (HV) terminal connected to a power battery, and a Low Voltage (LV) terminal connected to a direct current load;
the primary winding is connected to the AC terminal through a primary full-bridge rectifier circuit one of the secondary windings is connected to the HV terminal through a secondary full-bridge rectifier circuit; and the other of the secondary windings is connected to the LV terminal through a secondary half-bridge rectifier circuit;
when the AC terminal is idle, the LV terminal is powered by the HV terminal;
when the AC terminal is connected to the alternating current, the LV terminal and the HV terminal are both powered by the AC terminal; and
when the AC terminal is connected to the alternating current load, the AC terminal and the LV terminal are both powered by the HV terminal.

2. The on-board integrated charging device according to claim 1, wherein a series resonance circuit is also arranged between the primary full-bridge rectifier circuit and the primary winding.

3. A current distribution calculating method for an on-board integrated charging device, comprising the following steps:
providing the on-board integrated charging device, wherein the on-board integrated charging device comprises a voltage conversion module, and wherein:
the voltage conversion module is provided with an Alternating Current (AC) terminal connected to an alternating current or an alternating current load, a High Voltage (HV) terminal connected to a power battery, and a Low Voltage (LV) terminal connected to a direct current load;
when the AC terminal is idle, the LV terminal is powered by the HV terminal;
when the AC terminal is connected to the alternating current, the LV terminal and the HV terminal are both powered by the AC terminal; and
when the AC terminal is connected to the alternating current load, the AC terminal and the LV terminal are both powered by the HV terminal;
taking an input current of the LV terminal as an actual current of the HV terminal when the LV terminal is only powered by the HV terminal;
acquiring a theoretical current $I_{hv}$ of the current HV terminal through a preset first calculation method when the HV terminal and the LV terminal are both powered by the AC terminal, wherein the input current of the LV terminal is acquired from the theoretical current $I_{hv}$ of the current HV terminal minus the actual current $I_{hv1}$ of the current HV terminal; and
acquiring a theoretical current $I_{hv}$ of the current HV terminal through a preset second calculation method when the AC terminal and the LV terminal are both powered by the HV terminal, wherein the input current of the LV terminal is acquired from the actual current $I_{hv1}$ of the current HV terminal minus the theoretical current $I_{hv}$ of the current HV terminal.

4. The current distribution calculating method for the on-board integrated charging device according to claim 3, wherein the first calculation method includes:
selecting a corresponding efficiency $\eta_1$ from a preset first efficiency comparison table according to the power of the current HV terminal and the power of the LV terminal, and selecting corresponding adjustment coefficients $k_1$ and $b_1$ from a preset first adjustment coefficient comparison table according to a model of the current on-board integrated charging device;
calculating input power $P_{ac}$ of the AC terminal according to an actual voltage and an actual current of the current AC terminal;
calculating theoretical output power $P_{hv}$ of the current HV terminal, $P_{hv}=P_{ac}\div(k_1\times\eta_1+b_1)$; and
calculating the theoretical current $I_{hv}$ of the current HV terminal according to $P_{hv}$ and the actual voltage of the current HV terminal.

5. The current distribution calculating method for the on-board integrated charging device according to claim 4, wherein
the first efficiency comparison table has a first standard two-dimensional array; two dimensions of the first standard two-dimensional array are segment power of the HV terminal and segment power of the LV terminal, respectively; each array element in the first standard two-dimensional array has a corresponding efficiency $\eta_1$; and
the first adjustment coefficient comparison table has a plurality of different on-board integrated charging device models, wherein each on-board integrated charging device model has corresponding adjustment coefficients $k_1$ and $b_1$.

6. The current distribution calculating method for the on-board integrated charging device according to claim 5, wherein
when the HV terminal and the LV terminal are powered by the AC terminal, a maximum value of the sum of the output power of the HV terminal and the output power of the LV terminal is rated total power P1; the first standard two-dimensional array is acquired in segments according to the rated total power P1, and the efficiency $\eta_1$ corresponding to each array element in the first standard two-dimensional array is collected; and
several array elements in the first standard two-dimensional array are selected as first calibration array elements, an actual efficiency $\eta_x$ of an on-board integrated charging device to be tested under different first calibration array elements is collected, and adjustment coefficients $k_1$ and $b_1$ of the model of the on-board integrated charging device are calculated according to the actual efficiency $\eta_x$ and the $\eta_1$ of the corresponding first calibration array element, so that $\eta_x=k_1\times\eta_1+b_1$.

7. The current distribution calculating method for the on-board integrated charging device according to claim 3, wherein the second calculation method includes:
selecting a corresponding efficiency $\eta_2$ from a preset second efficiency comparison table according to the power of the current AC terminal and the power of the current LV terminal, and selecting corresponding adjustment coefficients $k_2$ and $b_2$ from a preset second adjustment coefficient comparison table according to a model of the current on-board integrated charging device;
calculating input power $P_{ac}$ of the current AC terminal according to an actual voltage and an actual current of the current AC terminal;
calculating theoretical output power $P_{hv}$ of the current HV terminal, $P_{hv}=P_{ac}\div(k_2\times\eta_2+b_2)$; and
calculating the theoretical current $I_{hv}$ of the current HV terminal according to $P_{hv}$ and the actual voltage of the current HV terminal.

8. The current distribution calculating method for the on-board integrated charging device according to claim 7, wherein
the second efficiency comparison table has a second standard two-dimensional array; two dimensions of the second standard two-dimensional array are segment power of the AC terminal and segment power of the LV terminal, respectively; each array element in the second standard two-dimensional array has a corresponding efficiency $\eta_2$; and
the second adjustment coefficient comparison table has a plurality of different on-board integrated charging device models, wherein each on-board integrated charging device model has corresponding adjustment coefficients $k_2$ and $b_2$.

9. The current distribution calculating method for the on-board integrated charging device according to claim 8, wherein
when the AC terminal and the LV terminal are powered by the HV terminal, a maximum value of the sum of the output power of the AC terminal and the output power of the LV terminal is rated total power P2; the second standard two-dimensional array is acquired in segments according to the rated total power P2, and the efficiency $\eta_2$ corresponding to each array element in the second standard two-dimensional array is collected; and several array elements in the second standard two-dimensional array are selected as first calibration array elements, an actual efficiency $\eta_y$ of an on-board integrated charging device to be tested under different first calibration array elements is collected, and adjustment coefficients $k_2$ and $b_2$ of the model of the on-board integrated charging device are calculated according to the actual efficiency $\eta_y$ and the $\eta_2$ of the corresponding second calibration array element, so that $\eta_y = k_2 \times \eta_2 + b_2$.

10. The current distribution calculating method for the on-board integrated charging device according to claim 3, wherein the voltage conversion module comprises a transformer, wherein a primary winding is arranged on one side of the transformer, and two secondary windings which are connected in parallel are arranged on the other side of the transformer; the primary winding is connected to the AC terminal through a primary full-bridge rectifier circuit; one of the secondary windings is connected to the HV terminal through a secondary full-bridge rectifier circuit; and the other of the secondary windings is connected to the LV terminal through a secondary half-bridge rectifier circuit.

11. The current distribution calculating method for the on-board integrated charging device according to claim 10, wherein a series resonance circuit is also arranged between the primary full-bridge rectifier circuit and the primary winding.

\* \* \* \* \*